United States Patent [19]
Amon

[11] Patent Number: 5,967,065
[45] Date of Patent: Oct. 19, 1999

[54] METHOD FOR DISPOSING OF PAPER IN AN ASPHALT PLANT

[76] Inventor: Thomas R. Amon, 219 Sunset Dr., Elkhorn, Wis. 53121

[21] Appl. No.: 09/020,435

[22] Filed: Feb. 9, 1998

Related U.S. Application Data

[63] Continuation-in-part of application No. 08/645,952, May 10, 1996, Pat. No. 5,735,223, which is a continuation-in-part of application No. 08/371,161, Jan. 11, 1995, Pat. No. 5,520,124.

[51] Int. Cl.$^6$ ................................................ F23G 11/00
[52] U.S. Cl. ................. 110/346; 110/226; 110/246; 110/261; 110/347; 432/103; 366/25
[58] Field of Search ................................... 110/226, 235, 110/246, 260, 261, 262, 346, 347, 348; 432/103, 105; 366/3, 4, 6, 22, 23, 24, 25, 30, 147; 34/137, 131

[56] References Cited

U.S. PATENT DOCUMENTS

| | | | |
|---|---|---|---|
| 4,179,263 | 12/1979 | Jung et al. | 110/346 X |
| 4,253,405 | 3/1981 | Cottrell et al. | 110/222 |
| 4,492,171 | 1/1985 | Brashears et al. | 110/261 |
| 5,005,493 | 4/1991 | Gitman | 110/246 |
| 5,018,459 | 5/1991 | Judd | 110/346 |
| 5,054,406 | 10/1991 | Judd | 110/346 |
| 5,090,813 | 2/1992 | McFarland et al. | 366/23 |
| 5,102,330 | 4/1992 | Ho | 110/246 X |
| 5,176,445 | 1/1993 | Mize | 366/7 |
| 5,178,456 | 1/1993 | Marconnet | 366/25 |
| 5,257,587 | 11/1993 | Ohlsen et al. | 110/346 |
| 5,273,355 | 12/1993 | May et al. | 366/23 |
| 5,297,957 | 3/1994 | Brashears | 432/14 |
| 5,342,442 | 8/1994 | Nechvatal et al. | 106/409 |
| 5,372,458 | 12/1994 | Flemmer et al. | 110/246 X |
| 5,392,721 | 2/1995 | Judd | 110/346 |
| 5,553,554 | 9/1996 | Urich, Jr. | 110/246 X |

FOREIGN PATENT DOCUMENTS

| | | |
|---|---|---|
| 1012010 | 6/1977 | Canada . |
| 2 242005 | 9/1990 | Japan . |
| 1 384 474 | 2/1975 | United Kingdom . |

Primary Examiner—James C. Yeung
Assistant Examiner—Ljiljana V. Ciric
Attorney, Agent, or Firm—Michael Best & Friedrich LLP

[57] ABSTRACT

A method and apparatus for disposing of paper in an asphalt plant. The asphalt plant comprises a container for stone aggregate to be heated, a burner for producing a burner flame to provide thermal energy for heating the stone aggregate in the container, the burner being positioned relative to the container so that an open space is defined therebetween, and a supplementary burner positioned in the open space between the burner and the container. The supplementary burner includes a supplementary burner member for producing a supplementary burner flame to provide thermal energy for heating the stone aggregate in the container, an air supply connected to the supplementary burner member for providing a stream of air to the supplementary burner member, and a supply of paper connected to the air supply for introducing paper into the stream of air. The paper is introduced into the stream of air such that the paper is entrained in the stream of air and is substantially incinerated in the container. The asphalt plant may further comprise a grate which is spaced from the burners. The grate defines a plurality of openings such that hot air stream produced by burner flames passes through the openings, and such that the grate improves the thermal efficiency of the asphalt plant for heating the stone aggregate.

27 Claims, 4 Drawing Sheets

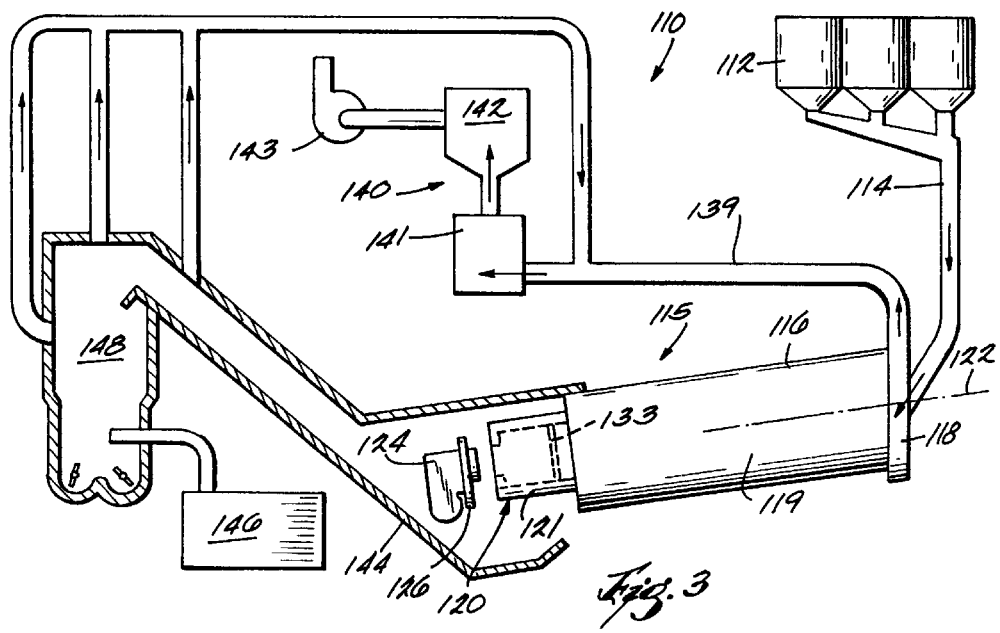
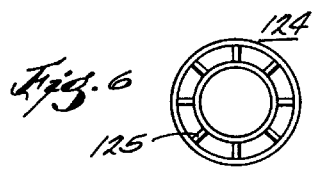
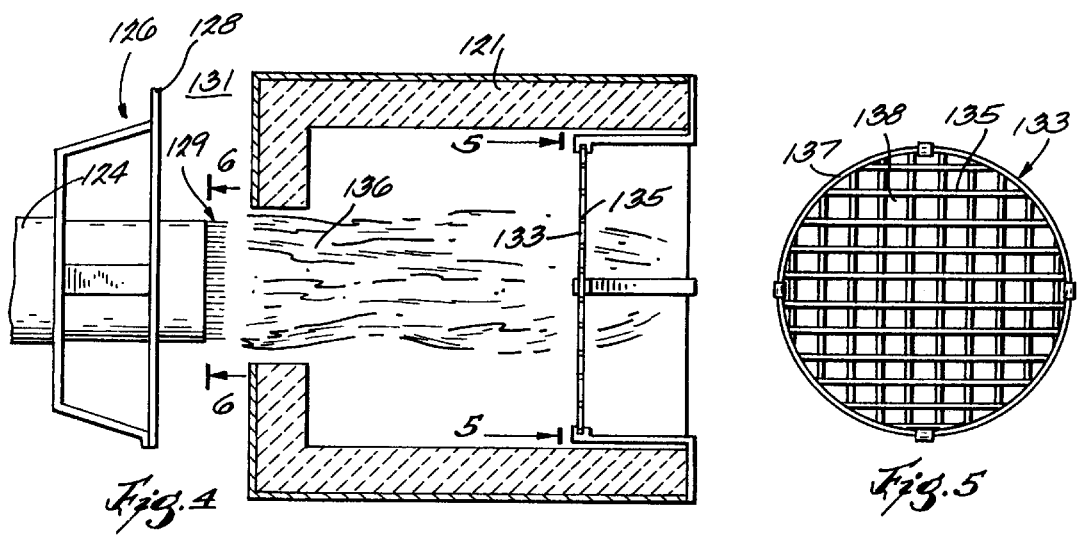

METHOD FOR DISPOSING OF PAPER IN AN ASPHALT PLANT

This application is a continuation-in-part of application Ser. No. 08/645,952 filed May 10, 1996, now U.S. Pat. No. 5,735,223 which is a continuation-in-part of application Ser. No. 08/371,161 filed Jan. 11, 1995, now U.S. Pat. No. 5,520,124.

BACKGROUND OF THE INVENTION

1. Field of the Invention

The invention relates to asphalt plants. More particularly, the invention relates to a method for disposing of paper in an asphalt plant.

2. Discussion of Prior Art

Asphalt mixtures of the type used for roadway surfacing or paving typically include stone aggregate and asphalt cement (hereinafter "asphalt"). As used herein, "asphalt" includes those mixtures of primarily hydrocarbon materials commonly referred to as "asphalt" and other binder materials suitable for producing asphalt paving mixtures or similar paving mixtures when mixed with stone aggregate. As used herein, "stone aggregate" includes any aggregate material suitable for use in asphalt paving mixtures or similar paving mixtures for roadway surfacing. Asphalt mixtures for asphalt paving are produced in an asphalt plant, typically by heating and thus drying the stone aggregate, and then mixing the hot stone aggregate with liquid asphalt. Typically, an asphalt paving mixture includes about 5% of asphalt and about 95% of stone aggregate.

U.S. Pat. No. 5,273,355 relates to an aggregate dryer and soil incinerator. The apparatus is adapted to heat and dry stone aggregate useful in the production of an asphalt paving mixture, and also is adapted to incinerate contaminated soil. The apparatus comprises a rotary dryer for heating and drying the stone aggregate, and a separate rotary incinerator for incinerating the soil.

SUMMARY OF THE INVENTION

The invention provides a method for disposing of paper by incinerating the paper in an asphalt plant and incorporating the ash into the asphalt mixture for use in asphalt paving operations.

The invention provides a method for disposing of paper by incinerating the paper in an asphalt plant, such that incineration of the paper contributes thermal energy for producing the asphalt mixture.

More particularly, the invention provides an asphalt plant including feed bins for providing stone aggregate and a container, such as a rotary dryer, for drying and heating the stone aggregate. The asphalt plant also includes a burner for providing thermal energy to dry and heat the stone aggregate in the dryer. The burner includes a supply of burner fuel and a supply of burner air and produces a flame. The flame is directed into the dryer for supplying thermal energy to dry and heat the asphalt aggregate in the dryer. The burner is positioned at one end of the dryer, such that atmospheric air is supplied to the flame and interacts with the flame to produce a hot airstream which passes through the dryer. The asphalt plant also includes an air filter which collects particles from the hot airstream as a filter residue. Preferably, the filter residue is incorporated into the asphalt mixture. The asphalt plant also includes a supply of asphalt and a mixer for mixing the stone aggregate and asphalt to produce the asphalt mixture for use in asphalt paving operations.

The asphalt plant also includes a stream of oxygen or air, such as compressed or pressurized air. The stream of air is introduced into the flame. The asphalt plant includes a supply of paper, such as comminuted paper, which is introduced into the stream of air. The comminuted paper is mixed with and entrained in the stream of compressed or pressurized air. The small stream of compressed or pressurized air may provide an excess amount of oxygen in the immediate vicinity of the comminuted paper for a brief period. The comminuted paper thus is substantially incinerated in the flame and contributes thermal energy for heating and drying the stone aggregate and producing the asphalt paving. A small proportion of ash is produced by incineration of the comminuted paper and incorporated into the asphalt mixture.

The invention also provides an asphalt plant which includes a dryer unit having therein a grate which is generally perpendicular to the direction of flow of the burner flame and the hot airstream. The hot airstream (and possibly the burner flame) extends and passes through openings in the grate. The grate improves the thermal efficiency of the dryer unit for heating and drying the stone aggregate. In one embodiment, the grate improves the combustion efficiency of the dryer unit for incinerating paper.

An existing asphalt plant including a typical main burner may be retro-fitted or adapted to include a supplementary burner capable of disposing of paper. Alternatively, an asphalt plant may be initially constructed to include both the typical main burner and the supplementary burner for disposing of paper.

In either case, the asphalt plant includes a container containing stone aggregate and the main burner for producing a burner flame to provide thermal energy for heating the stone aggregate in the container. The burner is positioned relative to the container so that an open space is defined between the burner and the container.

The asphalt plant also includes a supplementary burner positioned in the open space between the burner and the container. The supplementary burner includes a supplementary burner member for producing a supplementary burner flame extending into the container, an air supply connected to the supplementary burner member, and a supply of paper connected to the air supply for introducing paper into the stream of air.

The burner is operated to produce the burner flame to heat the stone aggregate. The supplementary burner is operated by producing a supplementary burner flame extending into the container, providing the stream of air into the supplementary burner flame, and introducing the paper into the stream of air such that the paper is entrained in the stream of air and is substantially incinerated in the container.

The invention also provides an apparatus for producing an asphalt mixture for use in asphalt paving operations. The apparatus comprises the asphalt plant including a container, a burner, and a supplementary burner. The apparatus also comprises means in communication with the asphalt plant for mixing the stone aggregate and ash with asphalt to produce the asphalt mixture.

Other features of and advantages of the invention will become apparent to those skilled in the art upon review of the following detailed description, claims, and drawings.

BRIEF DESCRIPTION OF THE DRAWINGS

FIG. 3 is a schematic diagram of an asphalt plant which is an alternative embodiment of the invention.

FIG. 4 is an enlarged, partial sectional view of the drying unit in the asphalt plant shown in FIG. 3.

FIG. 5 is a view of the grate taken generally along line 5—5 in FIG. 4.

FIG. 6 is a view of the burner taken generally along line 6—6 in FIG. 4.

Figure 1:
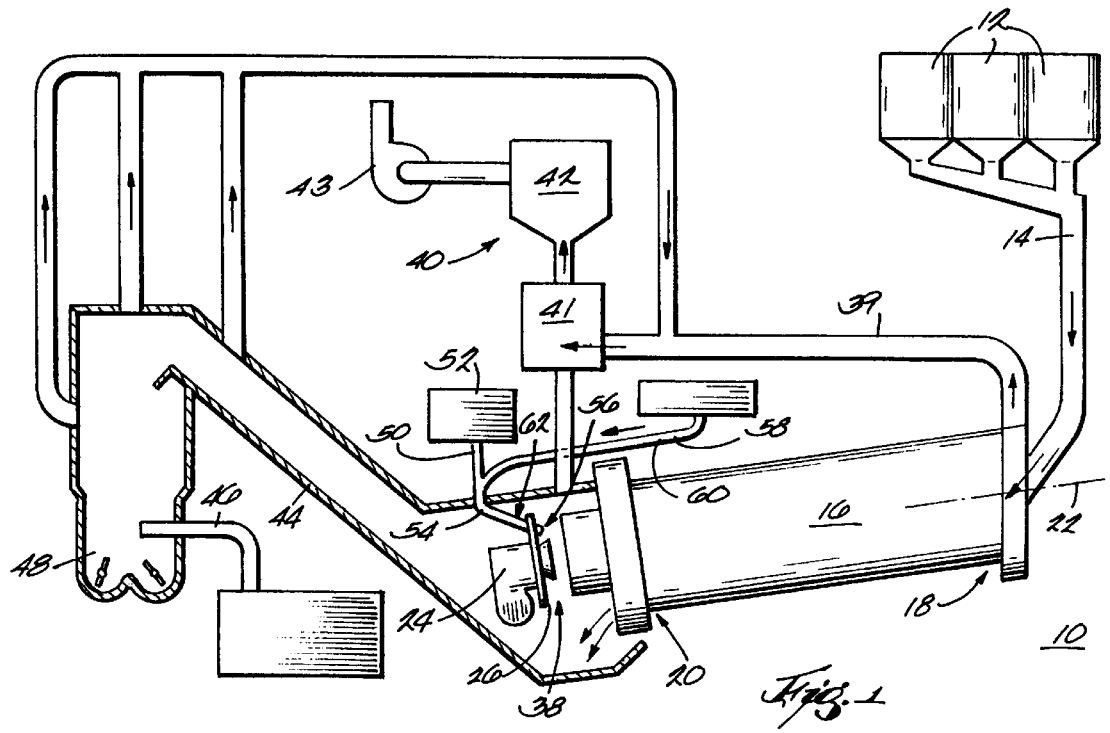
FIG. 1 is a schematic diagram of an asphalt plant including various features of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF A PREFERRED EMBODIMENT

Illustrated in FIG. 1 is an asphalt plant 10 for producing an asphalt mixture for use in asphalt paving operations and which is adapted for disposing of paper. Although another suitable type of asphalt plant, such as a drum mix plant, can be used, in the illustrated embodiment the asphalt plant 10 is a batch plant.

The asphalt plant 10 includes feed bins 12 for providing stone aggregate. In the illustrated embodiment, the feed bins 12 are adapted to provide three types, or any mixture thereof, of stone aggregate. A conveyor or feed conduit 14 communicates with the feed bins 12. In the illustrated embodiment, the proportion of stone aggregate is not appreciably reduced by the amount of ash incorporated into the asphalt. In one embodiment, the proportion of stone aggregate in the asphalt mixture may be slightly less than the typical proportion (about 95%), being slightly reduced from the typical proportion by an amount roughly equal to the ash produced upon incineration of the paper and incorporated into the asphalt mixture.

The asphalt plant 10 includes a drum or container 16 for drying and heating the stone aggregate. In the illustrated embodiment, the container 16 is a rotary dryer. The dryer 16 includes an inlet end 18 and an outlet end 20 spaced from the inlet end 18. The dryer 16 rotates about a longitudinal axis 22. The feed conduit 14 communicates with the inlet end 18 of the dryer 16 for delivering the stone aggregate from the feed bins 12 to the rotary dryer 16. The dryer 16 has therein flights which lift and advance the stone aggregate as the dryer rotates. The stone aggregate thus moves through the dryer 16 from the inlet end 18 to the outlet end 20.

Figure 2:
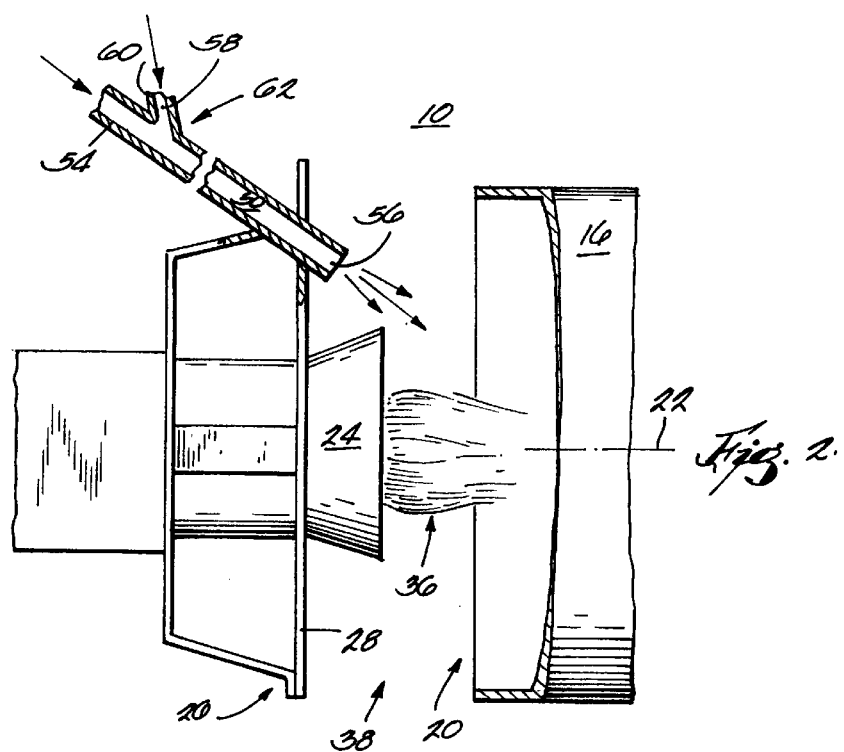
FIG. 2 is enlarged view of the dryer and burner illustrated in FIG. 1.

The asphalt plant 10 includes a burner 24 for providing thermal energy to dry and heat the stone aggregate in the dryer 16. A support structure 26 supports the burner 24. In the illustrated embodiment, the support structure 26 includes a wall 28. The wall 28 surrounds the burner 24 and extends perpendicularly to the longitudinal axis 22. The burner 24 includes a supply of burner fuel, which in the illustrated embodiment is oil. The amount of burner fuel typically is in the range of several hundred gallons of oil per hour. The burner 24 also includes a supply of burner air. The amount of burner air typically is in the range of several thousands of cubic feet per minute. As best shown in FIG. 2, the burner 34 produces a flame 36. The burner flame 36 typically produces several million BTU's per hour of thermal energy.

In the illustrated embodiment, the burner 24 is positioned at the outlet end 20 of the dryer 16. The flame 36 is directed into the outlet end 20 of the dryer 16 for supplying thermal energy to dry and heat the stone aggregate in the dryer 16. In the illustrated embodiment, the burner 24 and wall 28 are spaced slightly from the outlet end 20 of the dryer 16, such that an opening 38 is defined between the burner 24 and wall 28 and the outlet end 20. In another embodiment (not shown), the burner 24 may be enclosed, for example, by not spacing the burner 24 and wall 28 from the outlet end 20 of the dryer 16.

Ambient or atmospheric air is supplied to the dryer 16 and flame 36 through the opening 38. The flame 36 interacts with the atmospheric air to produce a hot airstream which passes through the dryer 16 from the outlet end 20 to the inlet end 18. The hot airstream passes out of the dryer 16 at the inlet end 18. The amount of atmospheric air supplied to the dryer typically is several tens of thousands of cubic feet per minute.

The asphalt plant 10 includes an air conduit 39 which communicates with the dryer 16 and a baghouse or dust collector 40. The hot airstream flows from the dryer 16, through the conduit 39 and into the dust collector 40. The dust collector 40 includes a primary air filter 41 and a secondary air filter 42. The dust collector 40 also includes an exhaust fan 43 for drawing the hot airstream through the air filters 41 and 42 and expelling the filtered airstream into the atmosphere. As the hot airstream passes through the primary and secondary air filters 41 and 42, suspended particles are collected as a filter residue. Preferably, the filter residue is incorporated into the asphalt paving, such as by periodically mixing the filter residue into the asphalt paving in the pugmill.

The asphalt plant 10 includes a secondary conveyor or conduit 44. In the illustrated embodiment, the secondary conduit 44 is a bucket elevator. The secondary conduit 44 communicates with the outlet end 20 of the dryer 16 to remove dried and heated stone aggregate from the dryer 16.

The asphalt plant 10 includes a supply 46 of asphalt cement or asphalt. In the illustrated embodiment, the asphalt is a liquid mixture of primarily hydrocarbon materials. In different embodiments, the asphalt may be another binder material suitable for producing the asphalt mixture or a similar paving mixture when mixed with stone aggregate. In the illustrated embodiment, the proportion of asphalt in the asphalt mixture is about 5%.

The asphalt plant 10 includes a mixer 48 for mixing the stone aggregate and asphalt to produce the asphalt mixture for use in asphalt paving operations. Although any suitable mixer may be used, in the illustrated embodiment the mixer 48 is a pugmill. In another embodiment, such as a drum-mix asphalt plant, the container for drying the aggregate includes the mixer. The secondary conduit 44 communicates with the pugmill 48 to provide the dried and heated stone aggregate from the dryer 16 to the pugmill 48. The supply 46 of asphalt communicates with the pugmill 48 to provide liquid asphalt to the pugmill 48. The pugmill 48 mixes the stone aggregate and asphalt to produce the asphalt mixture. The asphalt mixture is delivered by gravity to a truck or storage container (not shown) for transportation to a remote site for incorporation into a roadway surface.

The asphalt plant 10 also includes a supply or stream 50 of oxygen or air. In the illustrated embodiment, the stream 50 is pressurized or compressed air. As shown in FIG. 1, the stream 50 of compressed air is provided from an air compressor 52. Alternatively, as described below, the stream 50 of air may be pressurized by a fan (not shown). A conduit 54 delivers the compressed air from the air compressor 52 to the dryer 16. In the illustrated embodiment, the conduit 54 is a flexible hose. The conduit 54 has an outlet 56. In the illustrated embodiment, the outlet 56 is a steel nozzle or fitting mounted in the wall 28. The outlet 56 directs the stream 50 of compressed air leaving the conduit 54 at an angle relative to the longitudinal axis 22. The outlet 56 thus introduces the stream 50 of compressed air into the flame 36. In another embodiment, the asphalt plant may include a plurality of conduits and outlets for directing a plurality of streams of air into the flame. In another embodiment, the stream of compressed air is introduced in close proximity to the flame 36. Although different proportions of air can be used, in the illustrated embodiment, the stream 50 of compressed air is small in comparison to the amount of burner air and atmospheric air supplied to the burner and dryer. For example, in one embodiment about 150 cubic feet per minute of compressed air was supplied to a dryer using several thousand cubic feet per minute of burner air and several tens of thousands of cubic feet per minute of atmospheric air.

The asphalt plant 10 further includes a supply 58 of paper. The paper can be in any suitable form, and in the illustrated embodiment the paper is comminuted. More particularly, in the illustrated embodiment the paper is comminuted by shredding, for example, by a hammermill (not shown). The comminuted or shredded paper can be of any suitable size, varying over a broad range. In one embodiment, the shredded paper has an average width in the range of about 0.25 inches to about 0.5 inches and a length in the range of about 2 inches to about 14 inches or more. In one embodiment, the comminuted paper has an average width in the range of about 0.5 inches to about 2 inches and a length in the range of about 0.5 inches to about 2 inches.

The supply 58 of comminuted paper is connected to the conduit 54 to introduce the comminuted paper into the stream 50 of compressed air. In the illustrated embodiment, the supply 58 of comminuted paper includes a flexible hose or conduit 60 which is connected to the conduit 54 by a Y-fitting 62. The comminuted paper is drawn or introduced into the stream 50 of compressed air, such that the comminuted paper is mixed with and entrained in the stream 50 of compressed air.

In another embodiment (not shown), however, the hammermill for comminuting the paper may include the fan for producing the stream 50 of pressurized air. In such an embodiment, the comminuted paper is introduced directly into the stream 50 of pressurized air as the paper is comminuted.

In either case, the stream 50 of compressed or pressurized air having therein the entrained comminuted paper is introduced into the flame 36. The pressurized or compressed air 50 provides a large or excess amount of oxygen in the immediate vicinity of the comminuted paper. Therefore, the comminuted paper is substantially incinerated in the flame 36. The comminuted paper thus contributes thermal energy for heating and drying the stone aggregate and producing the asphalt mixture. Although the proportion of paper introduced into the dryer 16 can vary over a broad range, such as from less than 1% to about 10% or more, in the illustrated embodiment, the proportion of paper introduced into the dryer is about 2% to about 3%, based upon the total weight of the asphalt mixture.

As used herein "paper" includes paper and suitable non-hazardous incinerable materials. As used herein, "incinerable" material means a material which is combustible in the presence of air or oxygen under the temperature and pressure conditions useful for producing the asphalt mixture, or which is otherwise suitably degraded by incineration or other thermal degradation processes under the temperature and pressure conditions useful for producing the asphalt mixture. As used herein, "non-hazardous" materials includes materials which upon incineration do not produce gases, liquids or solids which are classified under applicable law as hazardous to human health or the environment. As used herein, "non-hazardous" materials may also include materials which when incinerated can produce gases, liquids or solids which are classified under applicable law as hazardous to human health or the environment when present in air, water, soil or other media in concentrations exceeding levels established by law, but which are not, in fact, produced in concentrations which exceed these established levels in the relevant media. As used herein, "non-hazardous" materials may also include materials which when incinerated can produce gases, liquids or solids which are classified under applicable law as hazardous to human health or the environment when present in air, water, soil or other media in concentrations exceeding the levels established by law, and which are produced in concentrations which exceed the established levels in the relevant media, but which can be shown by scientific theory or testing to be intermediate products or to be products which are themselves degraded or destroyed by incineration or which are immobilized by incorporation into asphalt paving. Non-hazardous incinerable materials may include, for example, materials such as wood chips, cardboard, plastics, food waste, and household refuse from which hazardous materials and non-incinerable materials (such as most metals) have been removed. Non-hazardous incinerable materials may also include, for example, mixtures of non-hazardous incinerable materials and other materials, such as gypsum, which can be suitably incorporated into asphalt paving.

A relatively small amount or proportion of ash is produced by incineration of the comminuted paper and incorporated into the asphalt mixture. The amount of ash is greatly reduced from the proportion of paper introduced into the dryer 16. A portion of the ash will fall into and be mixed with the stone aggregate in the dryer 16, and thus will be incorporated into the asphalt mixture with the stone aggregate. A portion of the ash may be carried out of the dryer 16 in the hot airstream to the filter 40, and will be incorporated into the filter residue. Preferably, the filter residue is mixed into the asphalt mixture, and thus, this portion of the ash will be incorporated into the asphalt mixture. The relatively small proportion of ash incorporated into the asphalt mixture does not substantially adversely affect the utility of the asphalt mixture for roadway paving or surfacing.

In the illustrated embodiment, the asphalt mixture includes less than about 4% to about 7% of fine dust or ash, and thus has a suitably high proportion of air voids. In the illustrated embodiment, "fine" dust or ash means size P-200 or smaller. In other embodiments, the amount of size P-200 dust or ash may be adjusted to provide a suitable proportion of air voids in the asphalt mixture. Typically, the asphalt mixture for use in asphalt paving operations must include at least about 3% of air voids in order to prevent rutting under traffic.

The invention thus provides a method for disposing of paper in an asphalt plant as set forth above. The method includes the step of providing a container, such as a dryer, for heating the stone aggregate, and providing in the container a burner for producing a flame to provide thermal energy for heating the stone aggregate in the container. A stream of air is introduced into the burner flame. Paper is introduced into and entrained in the stream of air, and the stream of air having therein the entrained paper is introduced into the burner flame. The stream of air provides oxygen in the immediate vicinity of the paper, and the paper is incinerated in the container. Incineration of the paper produces ash which is incorporated into the asphalt mixture produced by the asphalt plant. Incineration of the paper thus contributes thermal energy for producing the asphalt mixture.

The invention provides a method and apparatus for producing the asphalt mixture including stone aggregate, asphalt and a small proportion of ash from paper incinerated in the asphalt plant. The asphalt mixture is produced as set forth above.

Ash resulting from incineration of the paper in the asphalt plant may serve as a so-called "extender" for the asphalt mixture. As used herein, "extender" means that the amount of asphalt mixture produced from a given amount of stone aggregate and asphalt is increased slightly by the presence of the ash. It is believed that the ash acts as an "extender" with regard to the amount of asphalt required to produce the asphalt mixture.

It is advantageous that paper is disposed in the asphalt plant, and resulting ash is incorporated into the asphalt mixture.

It is a further advantage that incineration of the paper contributes thermal energy for producing the asphalt mixture, and reduces the amount of burner fuel necessary for producing the asphalt mixture.

Illustrated in FIGS. 3–6 is an asphalt plant 110 which is an alternative embodiment of the invention. Unlike the previously described asphalt plant 10, the asphalt plant 110 is not particularly adapted for disposing of paper. Although any other suitable type of asphalt plant, such as a drum mix plant, can be used, in the illustrated embodiment the asphalt plant 110 is a batch plant.

The asphalt plant 110 includes feed bins 112 for providing stone aggregate. A conveyor or feed conduit 114 communicates with the feed bins 112.

The asphalt plant 110 includes a dryer unit 115 for heating and drying the stone aggregate. The dryer unit 115 includes a drum or container 116. In the illustrated embodiment, the container 116 is a counterflow rotary dryer. It should be understood that in another embodiment (not shown), another type of dryer, such as a parallel-flow dryer, can be used. The dryer 116 is a cylindrical vessel which has an inlet end 118 and an outlet end 120 and which rotates about a longitudinal axis 122. The feed conduit 114 communicates with the inlet end 118 for delivering the stone aggregate from the feed bins 112 to the dryer 116. The dryer 116 has therein flights which lift and advance the stone aggregate as the dryer rotates. The stone aggregate thus moves through the dryer 116 from the inlet end 118 to the outlet end 120.

The dryer 116 has a main chamber 119 having a large diameter. At the outlet end 120 the dryer 116 has a reduced diameter passage 121 which communicates between the main chamber 119 and a burner, as further described below.

In the illustrated embodiment, the passage 121 is lined with refractory brick and has an inner diameter of about 24" and a length of about 32".

The dryer unit 115 includes a burner 124 for providing a burner flame which provides thermal energy to dry and heat the stone aggregate in the dryer 116. A support structure 126 supports the burner 124. In the illustrated embodiment, the support structure 126 includes a wall 128 (FIG. 4) which surrounds the burner 124 and extends perpendicularly to the longitudinal axis 122. A supply (not shown) of burner fuel 129 is connected to the burner 124. Any suitable burner fuel 129, such as oil or natural gas, can be used. In the illustrated embodiment, the burner fuel 129 is oil. The burner fuel 129 is ejected under pressure from the burner 124 in a plurality of streams of atomized particles. The amount of burner fuel typically is in the range of several hundred gallons of oil per hour. As shown in FIG. 6, the burner 124 has an annular set of fins 125 for distributing the streams of atomized particles of burner fuel in an annular pattern. The burner 124 also includes a blower (not shown) for generating a flow of burner air.

The dryer unit 115 includes a primary supply of air 131. In the illustrated embodiment, the primary supply of air 131 is atmospheric air which enters or is drawn into the area of the burner flame through the open space 132 between the dryer 116 and the wall 128. The amount of primary air 131 typically is in the range of several tens of thousands of cubic feet per minute.

As best shown in FIG. 4, the burner 124 produces a burner flame 136 which extends through an opening and into the reduced diameter passage 121. The burner flame 136 interacts with the primary air 131 to produce a hot airstream which passes rapidly through the dryer 116 from the outlet end 120 to the inlet end 118. The hot airstream passes out of the dryer 116 at the inlet end 118.

The asphalt plant 110 also includes a grate 133 which is mounted in the reduced diameter passage 121 of the dryer 116. The burner flame 136 produces the hot airstream which passes through the grate 133. In the illustrated embodiment, the grate 133 includes a plurality of cross members 135 and a continuous annular outer edge member 137. The grate 133 is supported by radially spaced supports 139 which are mounted on the dryer 115. The cross members 135 cooperate to define a plurality of small openings 138. In the specific embodiment illustrated, each of the openings is about 2" wide, and the outer edge member 137 is about 22" in diameter. The cumulative cross sectional area of the openings 138 of the grate 133 is less than the cross sectional area of the passage 121. The grate 133 is constructed of a material, such as tungsten or a heat-resistant ceramic material, which is resistant to heat and oxidation in the burner flame 136. It is possible that a material such as stainless steel, which is moderately resistant to heat and oxidation in the burner flame 136, can be used and replaced frequently. The grate 133 improves the thermal efficiency of the burner 124 for heating and drying the stone aggregate, and thus reduces the amount of burner fuel 129 which is required to dry and heat the stone aggregate. The grate 133 thus increases the efficiency of the dryer unit 115 for heating and drying stone aggregate. While the applicant is uncertain specifically why the grate 133 improves the thermal efficiency of the burner 124, it is believed that the grate 133 reduces the velocity of the burner flame 136 and the hot airstream in the area near the burner 124, such that the burner fuel 129 is exposed to an environment which contains adequate oxygen for combustion for a longer period than if the burner flame 136 and hot airstream were unimpeded by the grate.

The asphalt plant 110 includes an air conduit 139 which communicates with the dryer 116 and a baghouse or dust collector 140. The hot airstream flows from the dryer 116, through the conduit 139 and into the dust collector 140. The dust collector 140 includes a primary air filter 141 and a secondary air filter 142. The dust collector 140 also includes an exhaust fan 143 for drawing the hot airstream through the air filters 141 and 142 and expelling the filtered airstream into the atmosphere.

The asphalt plant 110 includes a secondary conveyor or conduit 144 which communicates with the outlet end 120 of the dryer 116 to remove dried and heated stone aggregate from the dryer 116. The secondary conduit 144 communicates with a pugmill 148 to provide the dried and heated stone aggregate from the dryer 116 to the pugmill 148. The asphalt plant 110 also includes a supply 146 of asphalt cement or asphalt. The supply 146 of asphalt communicates with the pugmill 148 to provide liquid asphalt to the pugmill 148. The pugmill 148 mixes the stone aggregate and asphalt to produce asphalt paving.

It is an advantage that the hot airstream (and possibly the burner flame 136) extends and passes through the grate 133, such that the thermal efficiency of the dryer unit 115 for heating and drying the stone aggregate is improved.

Figure 7:
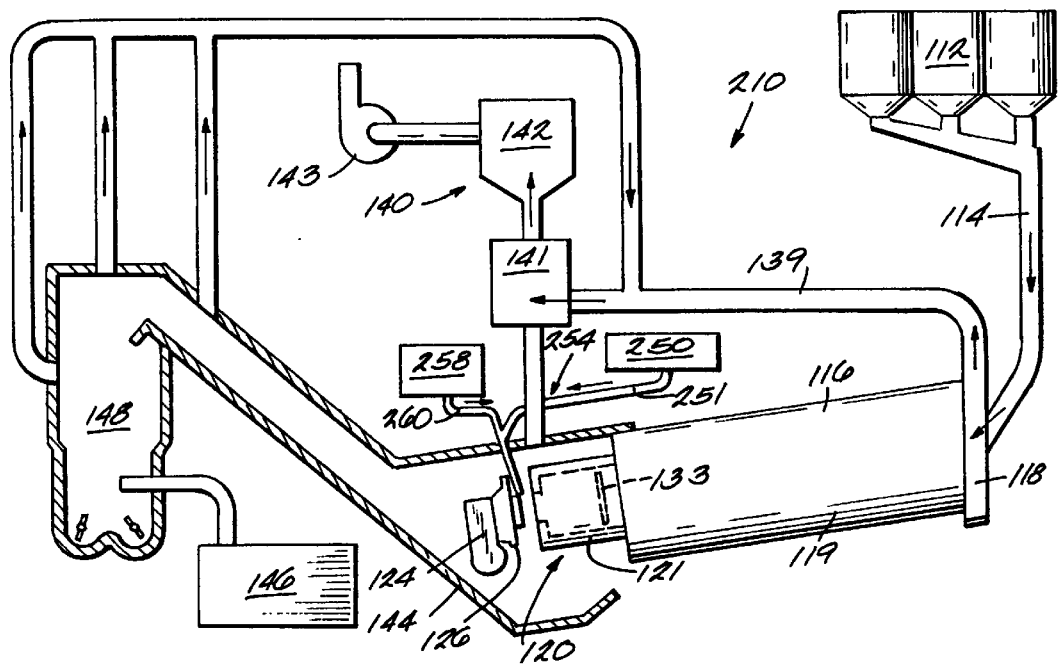
FIG. 7 is a schematic diagram of an asphalt plant which is a second alternative embodiment of the invention.
Figure 8:
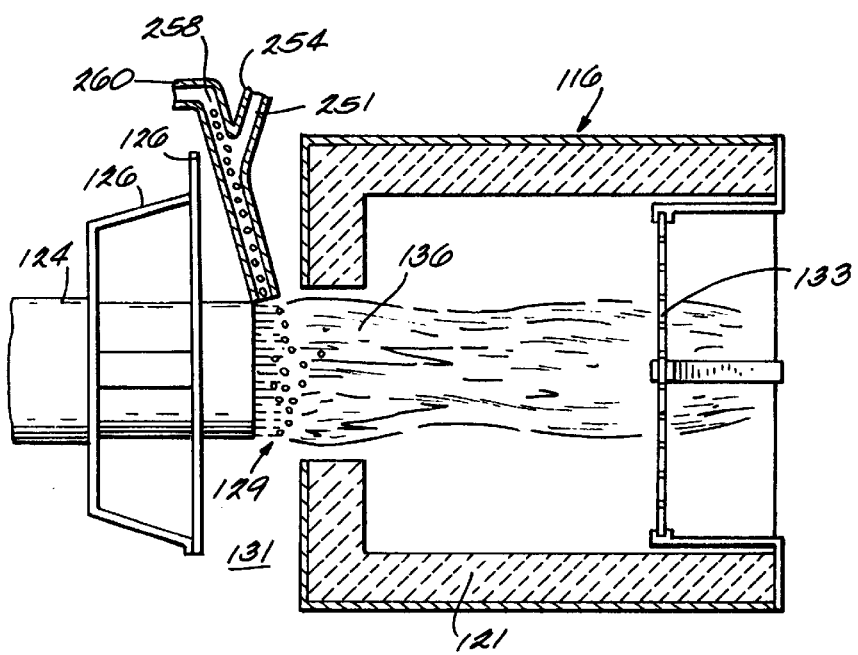
FIG. 8 is an enlarged, partial sectional view of the drying unit in the asphalt plant shown in FIG. 7.

Illustrated in FIGS. 7–8 is an asphalt plant 210 which is a second alternative embodiment of the invention. Except as otherwise described, the asphalt plant 210 is identical to the asphalt plant 110. Accordingly, common elements are identified by the same reference numbers.

The drying unit 115 of the asphalt plant 210 includes a secondary supply 250 of an oxygen-containing gas. In the illustrated embodiment, the oxygen-containing gas is air. More particularly, in the illustrated embodiment, the secondary supply 250 is a secondary stream of pressurized or compressed air 251. In another embodiment, the asphalt plant may include a plurality of such secondary streams of compressed air. The compressed air is provided from an air compressor (not shown). In other constructions (not shown), the secondary supply 250 of pressurized air may be provided by a fan.

A conduit 254 delivers the secondary stream of compressed air 251 from the air compressor to the base of the burner flame 136. The conduit 254 has an outlet which directs the secondary stream of compressed air 251 toward the streams of atomized particles of burner fuel 129 at the base of the burner flame 136 at an angle which is generally perpendicular to the direction of travel of the burner fuel exiting the burner 124. The secondary stream of compressed air 251 thus is introduced into the streams of atomized particles of burner fuel 129 at the base of the burner flame 36. Although a differently sized secondary stream of air can be used, in the illustrated embodiment, the secondary stream of compressed air 251 is small in comparison to the amount of burner air. For example, in one embodiment about 150 cubic feet per minute of compressed air is supplied to a dryer using several thousand cubic feet per minute of burner air.

The asphalt plant 210 further includes a supply 258 of paper. The paper can be in any suitable form, and in the illustrated embodiment the paper is comminuted. More particularly, in the illustrated embodiment the paper is comminuted by shredding, for example, by a hammermill (not shown). The comminuted or shredded paper can be of any suitable size, varying over a broad range. In one embodiment, the shredded paper has an average width in the range of about 0.25 inches to about 0.5 inches and a length in the range of about 2 inches to about 4 inches or more. In one embodiment, the comminuted paper has an average width in the range of about 0.5 inches to about 2 inches and a length in the range of about 0.5 inches to about 2 inches. Preferably, the paper is finely comminuted and has a width and length or maximum dimension of 0.5 inches.

The supply 258 of comminuted paper is connected to the conduit 254 to introduce the comminuted paper into the secondary stream of compressed air 251. In an alternative embodiment (not shown), the comminuted paper is introduced directly into the flame without being introduced into a secondary stream of compressed air. In yet another embodiment (not shown), the hammermill for comminuting the paper may include the fan for producing the stream 50 of pressurized air. In such an embodiment, the comminuted paper is introduced directly into the stream 50 of pressurized air as the paper is comminuted.

In the illustrated embodiment, the supply 258 of comminuted paper includes a flexible hose or conduit 260 which is connected to the conduit 254 by a Y-fitting. The comminuted paper is drawn or introduced into the secondary stream of compressed air 251, such that the comminuted paper is mixed with and entrained in the stream 50 of compressed air. Thus, the secondary stream (FIG. 8) of compressed air 251 having therein the entrained comminuted paper is introduced into the streams of atomized particles of burner fuel 129 at the base of the burner flame 136. By introducing the secondary stream of compressed air 251 in the direction perpendicular to the direction of travel of the burner fuel 129, the residence period of the paper in the oxygen-containing environment or portion of the burner flame is increased. More particularly, it is believed that the availability of oxygen for combustion of the paper is greatest in the portion of the burner flame 136 which is nearest the atmospheric or primary air 131 and, accordingly, the secondary stream of compressed air 251 and entrained paper is introduced at the base of the burner flame 136 such that the residence period of the paper in the oxygen-containing environment is maximized or improved. The secondary stream of compressed air 251 may provide an excess amount of oxygen in the immediate vicinity of the comminuted paper for a brief period. The comminuted paper is substantially incinerated in the burner flame 136. The comminuted paper thus contributes thermal energy for heating and drying the stone aggregate and producing the asphalt mixture. Although the proportion of paper introduced into the dryer can vary over a broad range, such as from less than 1% to about 10% or more, in the illustrated embodiment the proportion of paper introduced into the dryer is about 2% to about 3%, based upon the total weight of the asphalt mixture.

A relatively small amount or proportion of ash is produced by incineration of the comminuted paper. The ash is incorporated into the asphalt mixture with the stone aggregate, as previously described.

It is an advantage that the hot airstream (and possibly the burner flame 136) extends and passes through the grate 133, such that the combustion efficiency of the dryer unit 115 for incinerating paper is improved.

Figure 9:
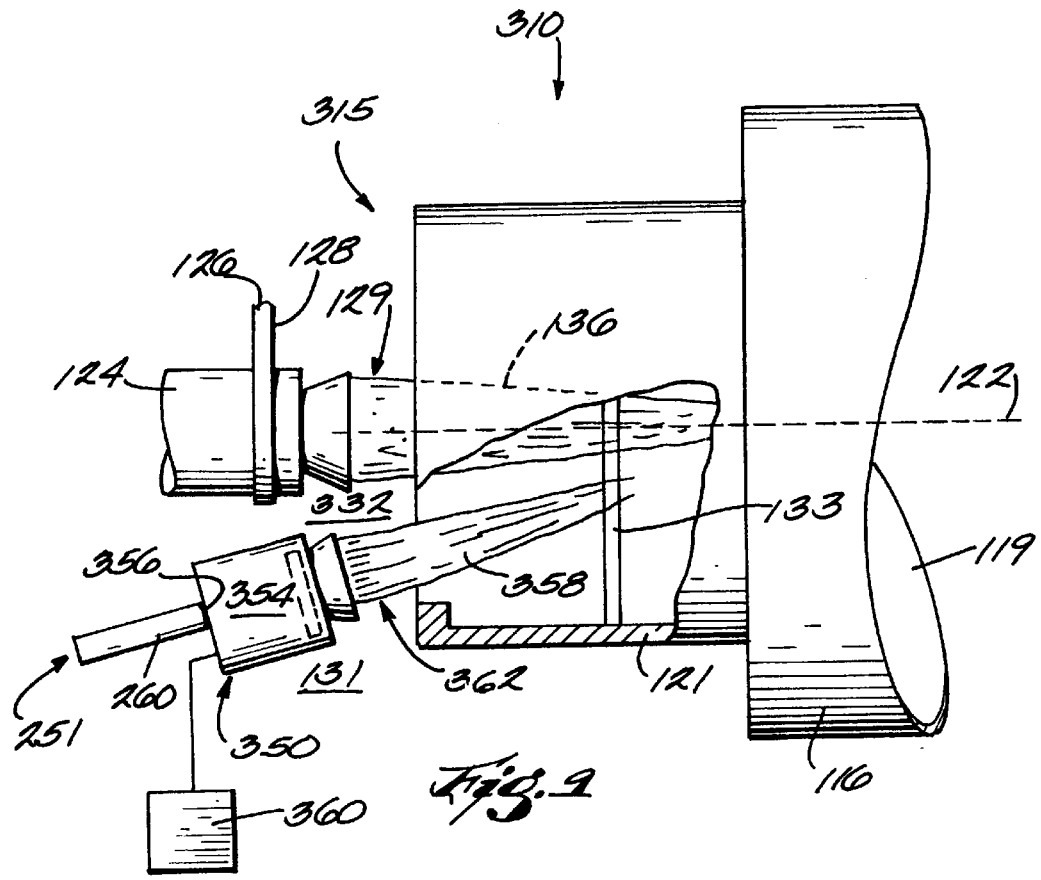
FIG. 9 is a top view of a portion of an asphalt plant which is a third alternative embodiment of the invention.
Figure 10:
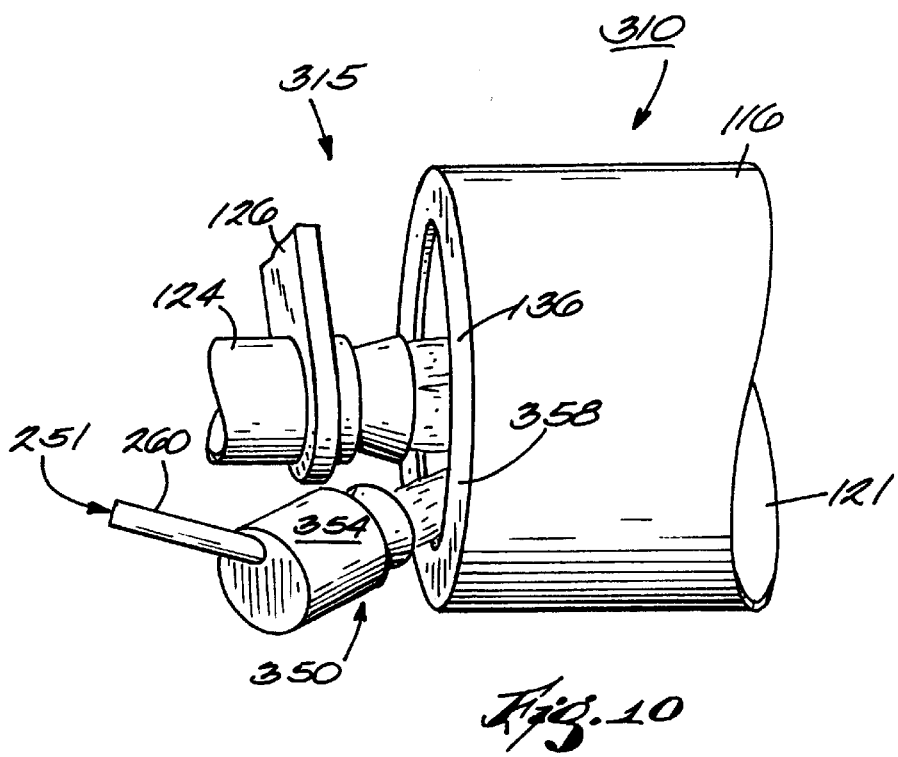
FIG. 10 is a perspective view of a portion of the asphalt plant shown in FIG. 9.

Partially illustrated in FIGS. 9–10 is an asphalt plant 310 which is a third alternative embodiment of the invention. Except as otherwise described, the asphalt plant 310 is identical to the asphalt plant 210 and will not be described in detail. Like elements are identified using like reference numbers.

The asphalt plant 310 includes a dryer unit 315 for heating and drying the stone aggregate. The dryer unit 315 includes the container or rotary dryer 116 (partially illustrated in FIGS. 9–10). As shown in FIG. 7, the feed bins 112 provide the stone aggregate to the inlet end 118 of the dryer 116 through the feed conduit 114. The stone aggregate moves through the dryer 116 from the inlet end 118 to the outlet end 120.

In the preferred embodiment, the dryer 116 includes the large chamber 119 (partially shown in FIG. 9) and the reduced diameter passage 121 (partially illustrated in FIGS. 9–10). The grate 133 (partially shown in FIG. 9) is mounted in the reduced diameter passage 121. In other constructions (not shown) of the asphalt plant 310, the dryer 116 may not include the reduced diameter passage 121, and the asphalt plant 310 may not include the grate 133.

The dryer unit 315 also includes the burner 124 which is the primary, main, or first burner for the asphalt plant 310. The burner 124 produces the primary burner flame 136 to provide thermal energy to dry and heat the stone aggregate in the dryer 116. The burner flame 136 extends through an opening and into the reduced diameter passage 121. The wall 128 of the support structure 126 for the burner 124 is spaced from the outlet end 120 of the dryer 116 so that an open space 332 (see FIG. 9) is provided adjacent to the burner 124 and in the vicinity of the outlet end 120 of the dryer 116. The dryer unit 315 also includes the primary supply of air 131 which is atmospheric air.

The asphalt plant 310 thus far described can be an existing asphalt plant to be adapted or retrofitted or a new asphalt plant to be constructed, as described further below.

The dryer unit 315 of the asphalt plant 310 also includes a supplementary, secondary, or second burner 350 so that paper can be disposed of in the asphalt plant 310 and so that wear on the grate 133 (if provided) is reduced, as described below. The supplementary burner 350 includes a supplementary burner member 354 for producing a supplementary burner flame 358 to provide additional thermal energy for heating the stone aggregate in the dryer 116. The burner member 354 is positioned in the open space 332 adjacent to the burner 124 and in the vicinity of the dryer 116. The open space 332 may be provided in the dryer unit 315 by moving the burner 124 relative to the dryer 116 to provide sufficient room for the burner member 354. The burner member 354 is positioned in the open space 332 so that the supplementary burner flame 358 extends though the opening in the reduced passage 121 and into the dryer 116.

While the supplementary burner 350 is shown positioned to one side of the burner 124, in other embodiments (not shown), the supplementary burner 350 may be positioned above or below or on either side of the burner 124 with the supplementary burner flame 358 being oriented in the corresponding direction relative to the burner flame 136.

In other embodiments (not shown), the grate 133 may be mounted in an orientation that is generally perpendicular to the supplementary burner flame 358 such that the grate 133 improves the thermal efficiency of the supplementary burner 350 for heating the stone aggregate.

A supply 360 of supplementary burner fuel 362 is connected to the burner member 354 and produces a stream of supplementary burner fuel 362. Any suitable burner fuel 362 can be used, and, in the illustrated construction, the burner fuel 362 is oil, like the primary burner fuel 129. The burner fuel 362 is ejected under pressure from the burner member 354 in a plurality of streams of atomized particles. The burner member 354 includes an annular set of fins (not shown) for distributing the streams of atomized particles of burner fuel 362 in an annular pattern. The supplementary burner 350 also includes a blower (not shown) for generating a flow of burner air.

The secondary supply 250 of an oxygen-containing gas is provided to the supplementary burner 350. In the illustrated construction, the secondary supply 250 is the secondary stream of pressurized or compressed air 251. In this construction, the secondary stream of pressurized air 251 is provided by a fan (not shown) in the hammermill (not shown) for comminuting the paper, as described below. In other constructions (similar to that shown in FIGS. 7 and 8), the secondary stream of pressurized air 251 is provided by the air compressor (not shown) through the conduit 254 and delivered to the supplementary burner flame 358. In yet other constructions (not shown), the asphalt plant 310 may include a plurality of secondary streams of pressurized or compressed air 251.

The supply of paper is also provided to the supplementary burner 350. As described above, the paper is incinerable non-hazardous material and can be in any suitable form. Also as described above, the proportion of paper introduced into the dryer 116 is about 2%–3%, based upon the total weight of the asphalt paving.

The paper is comminuted in the hammermill (not shown). The hammermill includes the fan for producing the secondary stream of pressurized air 251. As the paper is comminuted, the paper is thus introduced directly into the secondary stream of air 251, such that the comminuted or shredded paper is mixed with and entrained in the secondary stream of pressurized air 251. The entrained comminuted paper is then substantially incinerated in the dryer 116 and, thus, contributes thermal energy for heating and drying the stone aggregate and producing the asphalt mixture.

The supply of paper includes the flexible hose or conduit 260 which is connected directly to the supplementary burner member 354. In other constructions (similar to that shown in FIGS. 7 and 8), the conduit 260 may be connected to the conduit 254 to introduce the comminuted paper into the secondary stream of compressed air 251. In yet other constructions (not shown), the supply of paper is introduced directly into the supplementary burner flame 358 without being introduced into the secondary stream of compressed air 251.

In the illustrated construction, the conduit 260 is connected to the rear of the burner member 354 so that the secondary stream of pressurized air 251 and the supply of paper is introduced into the supplementary burner flame 358. In other constructions (similar to that shown in FIGS. 7–8), the conduit 260 may be connected to the forward portion of the burner member 354 so that the secondary stream of pressurized air 251 and the supply of paper are introduced into the base of the supplementary burner flame 358. In either case, the secondary stream of pressurized air 251 is introduced into the stream of supplementary burner fuel 362 at an angle that is generally perpendicular to the direction of travel of the supplementary burner fuel 362. By introducing the secondary stream of pressurized air 251 in the direction perpendicular to the direction of travel of the supplementary burner fuel 362, the residence period of the paper in the oxygen-containing environment or portion of the supplementary burner flame 358 is increased, as described above.

As shown in FIG. 7, the hot air stream flows from the dryer 116, through the conduit 139 and into the dust collector 140. The exhaust fan 143 draws the hot air stream through the air filters 141 and 142 and expels the filtered air stream into the atmosphere.

Also as shown in FIG. 7, dried and heated stone aggregate is removed through the outlet end 120 of the dryer 116 and provided to the pugmill 148 by the secondary conveyor or conduit 144. The supply of asphalt 146 provides liquid asphalt to the pugmill 148, and the pugmill 148 mixes the stone aggregate and the asphalt to produce the asphalt mixture. As described above, a relatively small amount or proportion of ash is produced by incineration of the comminuted paper, and the ash is incorporated into the asphalt mixture with the stone aggregate.

One advantage of the present embodiment is that an existing asphalt plant can be retrofitted or adapted to include a supplementary burner to dispose of paper.

Another advantage of the present embodiment is that the addition of the supplementary burner 350 to the dryer unit 315 reduces the air flow through the dryer unit 315. Generally, the combination of the flow of air and heat through the dryer unit 315 tends to disintegrate the grate 133. Reducing the flow of air through the dryer unit 315 by the adding the supplementary burner 350 decreases the wear on the grate 133. Therefore, the useful life of the grate 133 is increased. As a result, the grate 133 can be constructed of heat-resistant material or moderately heat-resistant material and still have a longer useful life.

Various features of the invention are set forth in the following claims.

What is claimed is:

1. A method of disposing of paper in an asphalt plant, the asphalt plant including a container for stone aggregate, the container having a container wall defining an open passage and a container interior, and the asphalt plant further including a burner for producing a burner flame to provide thermal energy for heating the stone aggregate in the container, the burner being positioned adjacent the container so that the burner flame extends into the container interior, said method comprising:

(a) providing an open space in the asphalt plant adjacent to the burner and in the vicinity of the container;
   (b) providing a supplementary burner for producing a supplementary burner flame, the supplementary burner including a fuel stream and a supply of paper for introducing paper into the fuel stream;
   (c) installing the supplementary burner in the asphalt plant so that the supplementary burner member is positioned in the open space;
   (d) producing a supplementary burner flame with the supplementary burner so that the supplementary burner flame extends into the container interior; and
   (e) introducing the paper into the fuel stream such that the paper is substantially incinerated in the container.

2. The method as set forth in claim 1 wherein the supplementary burner further includes an air supply for providing a stream of air to the fuel stream, and said method further comprising:

(f) introducing the paper into the stream of air such that the paper is entrained in the stream of air.

3. The method as set forth in claim 2 wherein said stream of air is pressurized air.

4. The method as set forth in claim 2 wherein the supplementary burner includes a supply of burner air other than the stream of air.

5. The method as set forth in claim 1 wherein incineration of the paper produces ash which is incorporated into an asphalt mixture produced by the asphalt plant.

6. The method as set forth in claim 1 wherein incineration of the paper contributes thermal energy for producing an asphalt mixture.

7. The method as set forth in claim 1 wherein the container is a rotatable dryer.

8. The method as set forth in claim 1 wherein the paper is incinerable non-hazardous material.

9. The method as set forth in claim 1 wherein the burner flame and the supplementary burner flame produce a hot air stream, and wherein the asphalt plant further includes a grate which is spaced from the burner, the grate defining a plurality of openings, such that the hot air stream passes through the openings, and such that the grate improves the thermal efficiency of the burner for heating the stone aggregate.

10. An asphalt plant comprising:

a container for stone aggregate to be heated, said container having a container wall defining an open passage and a container interior;
   a burner for producing a burner flame to provide thermal energy for heating the stone aggregate in said container, said burner being positioned adjacent said container so that the burner flame extends into the container interior, said burner being positioned relative to said container so that an open space is defined adjacent to said burner and in the vicinity of said container; and
   a supplementary burner for producing a supplementary burner flame extending into said container to provide thermal energy, said supplementary burner being positioned in said open space, said supplementary burner including
      a fuel stream, and
      a supply of paper for introducing paper into said fuel stream, the paper being introduced into the fuel stream such that the paper is substantially incinerated in the container.

11. The asphalt plant as set forth in claim 10 wherein said supplementary burner further includes an air supply for providing a supply of air to said fuel stream, and wherein the paper is introduced into the stream of air such that the paper is entrained in the stream of air.

12. The asphalt plant as set forth in claim 11 wherein said air supply is pressurized air.

13. The asphalt plant as set forth in claim 11 wherein said supplementary burner includes a supply of burner air other than the stream of air.

14. The asphalt plant as set forth in claim 10 wherein incineration of the paper produces ash which is incorporated into an asphalt mixture produced by the asphalt plant.

15. The asphalt plant as set forth in claim 10 wherein incineration of the paper contributes thermal energy for producing an asphalt mixture.

16. The asphalt plant as set forth in claim 10 wherein said container is a rotatable dryer.

17. The asphalt plant as set forth in claim 10 wherein the paper is incinerable non-hazardous material.

18. The asphalt plant as set forth in claim 10 wherein the burner flame and the supplementary burner flame produce a hot air stream, and wherein the asphalt plant further comprises a grate which is spaced from said burner, said grate defining a plurality of openings such that the hot air stream passes through said openings, and such that said grate improves the thermal efficiency of said asphalt plant for heating the stone aggregate.

19. The asphalt plant as set forth in claim 18 wherein said grate is mounted in said open passage in an orientation which is generally perpendicular to the burner flame and to the flow of the hot air stream through said open passage.

20. An asphalt plant as set forth in claim 18 wherein said open passage has a cross sectional area, and wherein said openings of said grate define a cumulative cross sectional area which is less than the cross sectional area of said open passage.

21. An apparatus for producing an asphalt mixture, said apparatus comprising:
- an asphalt plant including
   - a container for stone aggregate to be heated, said container having a container wall defining an open passage and a container interior;
   - a burner for producing a burner flame to provide thermal energy for heating the stone aggregate in said container, said burner being positioned adjacent said container so that the burner flame extends into the container interior, said burner being positioned relative to said container so that an open space is defined adjacent to said burner and in the vicinity of said container; and
   - a supplementary burner for producing a supplementary burner flame extending into said container to provide thermal energy, said supplementary burner being positioned in said open space, said supplementary burner including
      - a fuel stream, and
      - a supply of paper for introducing paper into the fuel stream, the paper being introduced into the fuel stream such that the paper is introduced into the supplementary burner flame and is substantially incinerated in the container; and
- means in communication with said asphalt plant for mixing the stone aggregate and ash with asphalt to produce the asphalt mixture.

22. The apparatus as set forth in claim 21 wherein said supplementary burner further includes an air supply for providing a stream of air to said fuel stream, and wherein the paper is introduced into the stream of air such that the paper is entrained in the stream of air.

23. The apparatus as set forth in claim 22 wherein said air supply is pressurized air.

24. The apparatus as set forth in claim 22 wherein said supplementary burner includes a supply of burner air other than the stream of air.

25. The apparatus as set forth in claim 21 wherein incineration of the paper contributes thermal energy for producing the asphalt mixture.

26. The apparatus as set forth in claim 21 wherein the paper is incinerable non-hazardous material.

27. The apparatus as set forth in claim 21 wherein the burner flame and the supplementary burner flame produce a hot air stream, and wherein said asphalt plant further includes a grate spaced from said supplementary burner member, said grate defining a plurality of openings such that the hot air stream passes through said openings and such that said grate improves the thermal efficiency of said asphalt plant for heating the stone aggregate.

* * * * *